United States Patent [19]
Guenther et al.

[11] Patent Number: 6,027,112
[45] Date of Patent: Feb. 22, 2000

[54] ADAPTIVE MULTIAGENT CONTROL SYSTEM FOR CONTROLLING OBJECT MOTION WITH SMART MATTER

[75] Inventors: Oliver Guenther; Tad H. Hogg, both of Mountain View; Bernardo A. Huberman, Palo Alto, all of Calif.

[73] Assignee: Xerox Corporation, Stanford, Conn.

[21] Appl. No.: 09/033,389

[22] Filed: Mar. 2, 1998

[51] Int. Cl.[7] ............................ B65H 29/24; G01K 15/00
[52] U.S. Cl. ........................... 271/194; 271/195; 364/557
[58] Field of Search ..................... 364/557; 271/194, 271/195, 227; 406/19, 88, 89, 90, 91

[56] References Cited

U.S. PATENT DOCUMENTS

| | | | |
|---|---|---|---|
| 4,618,292 | 10/1986 | Judgd et al. | 406/19 |
| 4,828,434 | 5/1989 | Fairman et al. | 406/88 |
| 4,874,273 | 10/1989 | Tokisue et al. | 406/88 |
| 5,398,462 | 3/1995 | Berlin et al. | 52/1 |
| 5,634,636 | 6/1997 | Jackson et al. | 271/225 |
| 5,682,331 | 10/1997 | Berlin | 364/557 |
| 5,691,921 | 11/1997 | Berlin | 364/557 |
| 5,803,448 | 9/1998 | Stiel et al. | 271/195 |
| 5,913,268 | 6/1999 | Jackson et al. | 101/420 |
| 5,921,544 | 6/1999 | Benedict | 271/226 |
| 5,927,203 | 7/1999 | Gieser et al. | 101/419 |

OTHER PUBLICATIONS

Oliver Guenther, Tad Hogg and Bernardo A. Huberman, "Multiagent Learning for Controlling Smart Matter," in Proc. of the AAAI97 Workshop on Multiagent Learning, pp. 36–40, Jul., 1997 (also "Learning In Multiagent Control of Smart Matter," available on the Internet at http://www.parc.xerox.com/spl/groups/dynamics/www/beam–learning.html).

Tad Hogg and Bernardo A. Huberman, "*Controlling Smart Matter*," Los Alamos preprint available on the Web at http://xxx.lanl.gov/abs/cond–mat/9611024, Nov. 4, 1996.

Bernardo A. Huberman and Tad Hogg, "The Behavior of Computational Ecologies," in Huberman (editor) "The Ecology of Computation," Amsterdam: North–Holland. 77–115.

"*MEMS Based Active Stabilization Of Structures*," available on the Web at http://www.parc.xerox.com/spl/project/MEMS/structural–enhance.html, Jan. 13, 1997.

*Primary Examiner*—William E. Terrell
*Assistant Examiner*—Kenneth W. Bower

[57] ABSTRACT

A multi-agent control system controls a transport assembly for moving objects. The transport assembly is formed using sensors and actuators that are proximately coupled in physical space. The multi-agent control system includes a learning mechanism which takes advantage of the proximate coupling between the sensors and actuators. The learning mechanism improves system performance by making iterative changes to an interaction matrix that represents the organizational structure of the multi-agent control system. In operation, the learning mechanism makes iterative changes to several of the elements $a_{ij}$, of the interaction matrix at one time, around a randomly chosen location (i,j) in the matrix. Changes to the interaction matrix continue to be made so long as the changes result in improved performance of the transport assembly. Advantageously, the learning mechanism enables the multi-agent control system to control the transport assembly without requiring knowledge of specific operating characteristics of the transport assembly.

20 Claims, 10 Drawing Sheets

| i\j | 1 | 2 | 3 | 4 | 5 | 6 | 7 | 8 | 9 | 10 |
|---|---|---|---|---|---|---|---|---|---|---|
| 10 | 0 | 0 | 0 | 0 | 0 | 0 | 0 | 0 | 0 | 1 |
| 9  | 0 | 0 | 0 | 0 | 0 | 0 | 0 | 0 | 1 | 0 |
| 8  | 0 | 0 | 0 | 0 | 0 | 0 | 0 | 1 | 0 | 0 |
| 7  | 0 | 0 | 0 | 0 | 0 | 0 | 1 | 0 | 0 | 0 |
| 6  | 0 | 0 | 0 | 0 | 0 | 1 | 0 | 0 | 0 | 0 |
| 5  | 0 | 0 | 0 | 0 | 1 | 0 | 0 | 0 | 0 | 0 |
| 4  | 0 | 0 | 0 | 1 | 0 | 0 | 0 | 0 | 0 | 0 |
| 3  | 0 | 0 | 1 | 0 | 0 | 0 | 0 | 0 | 0 | 0 |
| 2  | 0 | 1 | 0 | 0 | 0 | 0 | 0 | 0 | 0 | 0 |
| 1  | 1 | 0 | 0 | 0 | 0 | 0 | 0 | 0 | 0 | 0 |

| | 1 | 2 | 3 | 4 | 5 | 6 | 7 | 8 | 9 | 10 |
|---|---|---|---|---|---|---|---|---|---|---|
| 10 | 0 | 0 | 0 | 0 | 0 | 0 | 0 | 0 | 0 | 1 |
| 9 | 0 | 0 | 0 | 0 | 0 | 0 | 0 | 0 | 1 | 0 |
| 8 | 0 | 0 | 0 | 0 | 0 | 0 | 0 | 1 | 0 | 0 |
| 7 | 0 | 0 | 0 | 0 | 0 | 0 | 1 | 0 | 0 | 0 |
| 6 | 0 | 0 | 0 | 0 | 0 | 4/3 | 0 | 0 | 0 | 0 |
| 5 | 0 | 0 | 0 | 0 | 4/3 | 2/3 | 1/3 | 0 | 0 | 0 |
| 4 | 0 | 0 | 0 | 4/3 | 2/3 | 1 | 2/3 | 1/3 | 0 | 0 |
| 3 | 0 | 0 | 1 | 0 | 1/3 | 2/3 | 1/3 | 0 | 0 | 0 |
| 2 | 0 | 1 | 0 | 0 | 0 | 1/3 | 0 | 0 | 0 | 0 |
| 1 | 1 | 0 | 0 | 0 | 0 | 0 | 0 | 0 | 0 | 0 |

*FIG. 9*

ADAPTIVE MULTIAGENT CONTROL SYSTEM FOR CONTROLLING OBJECT MOTION WITH SMART MATTER

CROSS-REFERENCE TO RELATED APPLICATIONS

Cross-reference is made to the following U.S. Patent Applications, each of which is assigned to the same assignee as the present invention and hereby incorporated by reference: Ser. No. 09/033,792 applied for on Mar. 2, 1998, entitled "Multi-Hierarchical Control System For Controlling Object Motion With Smart Matter"; Ser. No. 09/033,221 applied for on Mar. 2, 1998, entitled "Market-Based Control System For Controlling Object Motion With Smart Matter"; and Ser. No. 09/033,222 applied for on Mar. 2, 1998, entitled "Distributed Control System With Global Constraints For Controlling Object Motion With Smart Matter".

BACKGROUND OF THE INVENTION 1. Field of the Invention

The present invention relates generally to a method and apparatus for controlling microelectromechanical systems (MEMS), and more particularly, to a multiagent control system which adaptively selects its organizational structure for controlling movement of an object on a transport assembly. 2. Description of Related Art Smart matter is defined herein as a physical system or material with arrays of microelectromechanical devices embedded therein for detecting and adjusting to changes in their environment. For example, smart matter can be used to move sheets of paper in a printing machine or maneuver an aircraft by performing tiny adjustments to wing surfaces. Generally, each microelectromechanical device embedded in smart matter contain microscopic sensors, actuators, and controllers. A characteristic of smart matter is that the physical system consists large numbers (possibly thousands) of microelectromechanical devices. These devices work together to deliver a desired higher level function (e.g., moving a piece of paper from one location to another or flying a plane).

Programs for controlling smart matter do not always adequately achieve the desired higher level function of issuing command to compensate for detected changes in a physical system because of the significant number of devices that operate in parallel to control it. That is, there exists a number of factors which make the computational task of a control program for smart matter difficult. One factor which may be cause control programs to be computationally intense is caused by the high redundancy of sensors and actuators in the physical material. In order for smart matter systems to exhibit the enhanced reliability and robustness over conventional systems, smart matter systems contain many more devices than necessary to achieve a desired performance. Failure or improper function of some elements, even a significant fraction, is compensated by the actions of the redundant components. Moreover, the ability of smart matter systems to tolerate component failure can be used beneficially to lower the fabrication cost of the components.

One approach for controlling smart matter is to rely on a single global processor coupled with rapid access to the full state of the system and detailed knowledge of system behavior. This method, however, has been proved ineffective because of the large number of devices embedded in smart matter. Another approach for controlling smart matter is through the use of a collection of autonomous computational agents (or elements) that use sensor information to determine appropriate actuator forces. Using multiple computational agents (i.e., distributed control) instead of a single global processor (i.e., central control) may prove more effective because each computational agent is only concerned with a limited aspect of the overall control problem. In some multi-agent systems, individual agents are associated with a specific sensor or actuator embedded in the physical system. This method for controlling smart matter defines a community of computational agents which, in their interactions, strategies, and competition for resources, resemble natural ecosystems. Furthermore, by distributing control among computational agents, the system as a whole is better able to adapt to environmental changes or disturbances because the system can compensate for new circumstances by simply changing the relationship of the agents.

Although multi-agent systems have been used to solve distributed control problems, they have been limited to systems which are physically large. For example, multi-agent systems have been used in distributed traffic control, flexible manufacturing, robotic system design, and self-assembly structures. It is difficult to use multi-agent systems to control smart matter because of the tight coupling between computational agents and their embedded physical space. Furthermore, controlling smart matter using traditional multi-agent systems is difficult because of mechanical interactions that decrease in strength with the physical distance between them. This makes the computational problem difficult because interactions between computational agents cannot be ignored.

When the values of system parameters are known, a global model which accurately defines system behavior can be constructed. In practice, however, sufficiently detailed information of the system is seldom available to construct such a global model of system behavior. Depending on the system, detailed information may not be readily available because behavioral changes due to environmental contamination of, or damage to, the system's actuators and/or sensors. It would, therefore, be desirable to have a distributed multi-agent system that can automatically adjusts its organization to continually improve performance in the face of such behavioral changes.

There exists, therefore, a need to provide a multi-agent system for controlling smart matter that solves these as well as other control problems. In addition, it would be desirable to provide a distributed control system for smart matter that is able to adapt to a physical system which has differing specifications because of manufacturing tolerances or defects. More specifically, it would be desirable to provide a controller for smart matter that robustly coordinates a physically distributed real-time response with many devices in the face of failures, delays, changing environmental conditions, and incomplete models of system behavior.

SUMMARY OF THE INVENTION

In accordance with the invention there is provided a transport assembly for moving an object. The transport assembly has sensor units and actuator units arranged thereon. The sensor units provide positional information of the object, while the actuator units control a resource for moving the object relative to the transport assembly. In addition, computational agents are coupled the sensor units and the actuator units. Each of the computational agents accumulate sensor information from a spatially localized grouping of sensor units. An adaptive controller coupled to the computational agents specifies an interaction structure that defines which of the computational agents share their accumulated sensor information with other of the computational agents when determining adjustments to the actuator units. The adaptive controller improving the performance of the transport assembly by making incremental adjustments to the interaction structure of the computational agents.

BRIEF DESCRIPTION OF THE DRAWINGS

These and other aspects of the invention will become apparent from the following description read in conjunction with the accompanying drawings wherein the same reference numerals have been applied to like parts and in which:

FIG. 8 illustrates an example of an initial interaction matrix having a local organization;

FIG. 9 illustrates an example of the initial interaction matrix shown in FIG. 8 after being incrementally modified.

DETAILED DESCRIPTION

A. Transport Assembly

Figure 1:
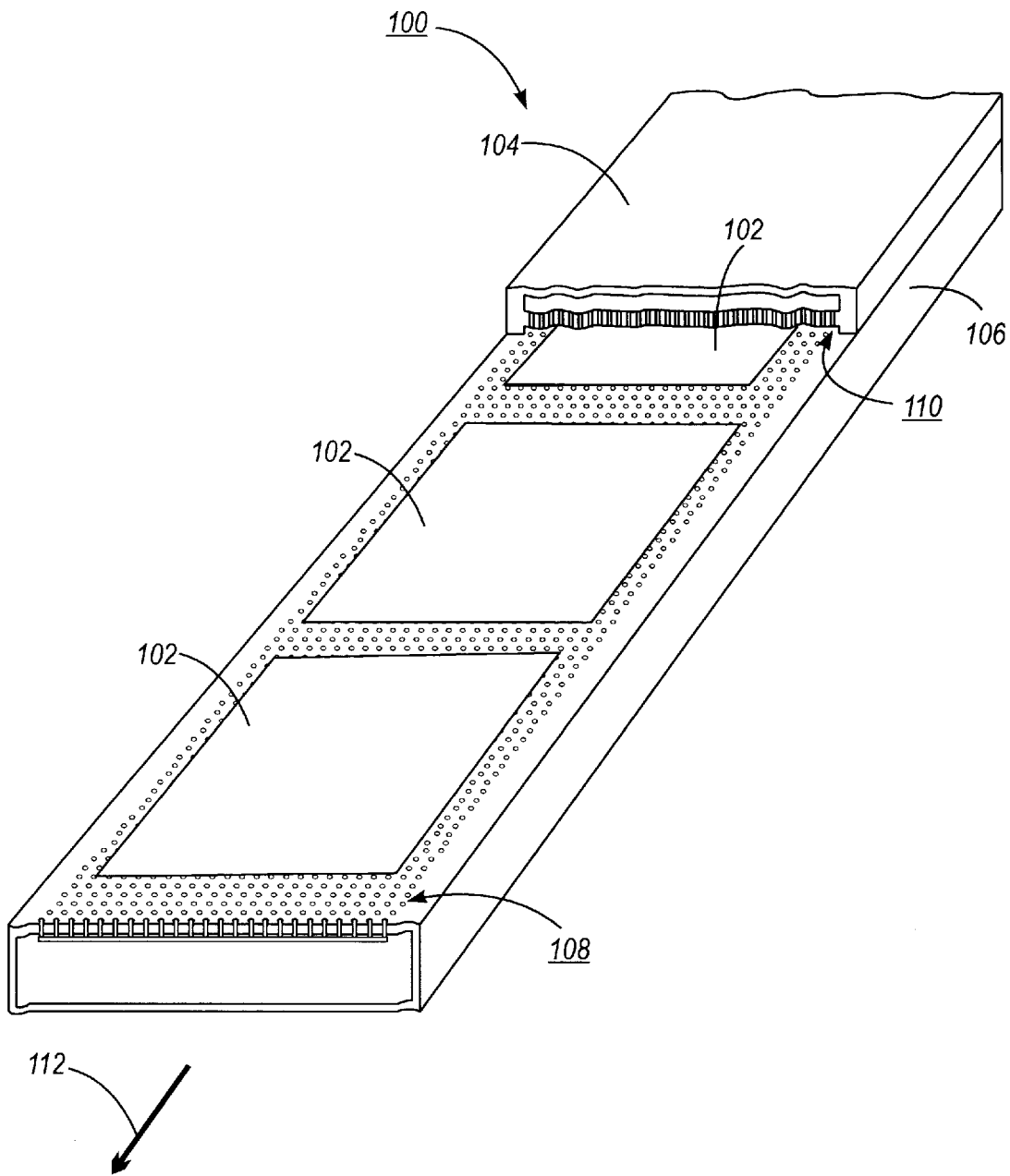
FIG. 1 illustrates a smart matter transport assembly for carrying out the present invention.

Referring now to the drawings where the showings are for the purpose of describing the invention and not for limiting same, FIG. 1 illustrates a transport assembly 100. The transport assembly 100, which is used to transport objects 102 in the process direction 112, is divided up into an upper section 104 and a lower section 106. For illustrative purposes part of the upper section 104 is cut away. Advantageously, the transport assembly 100 can transport a number of different types of materials such as paper, plastics, glass, foils, fabrics, uncured rubber and wafers. The sections 104 and 106 are sufficiently spaced apart to define a spacing 110 in which the object can travel along the transport assembly without contacting either the upper or lower sections 104 and 106. Embedded in both the upper and lower sections 104 and 106 are arrays of spatially fixed microelectromechanical devices 108 (MEMS) that dynamically support, move, and guide the objects 102 through the transport assembly 100. It will be understood by those skilled in the art that depending on the size, weight and flexibility of the object being transported and the speed and accuracy in which the object is required to be transported, the transport assembly may consist of only one of the upper section 104 or the lower section 106.

Figure 2:
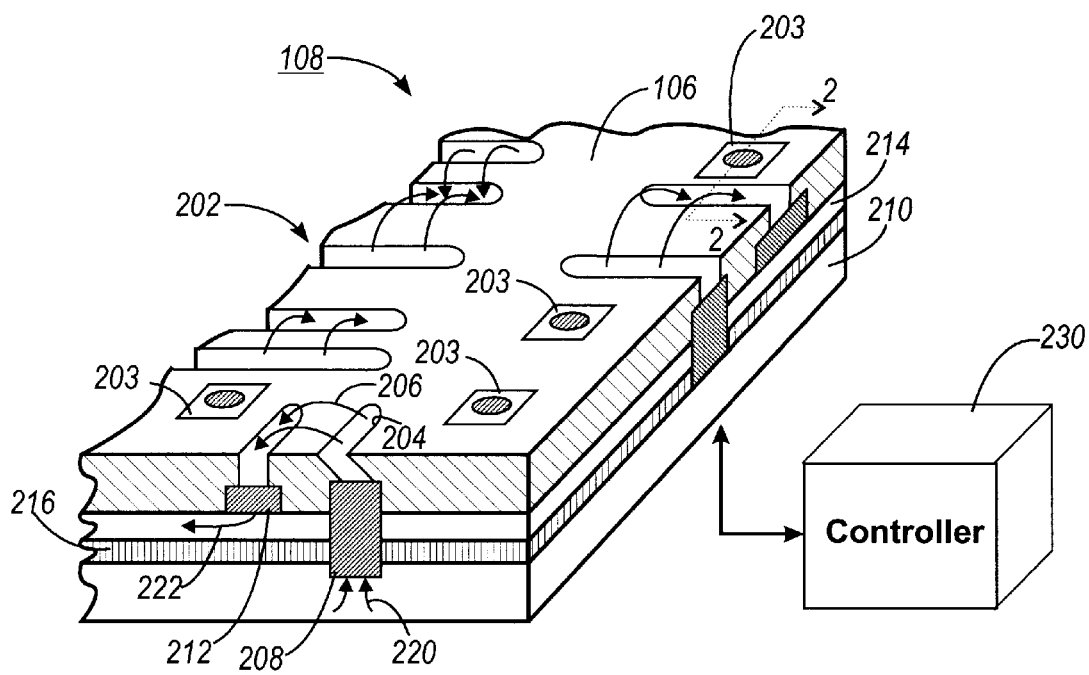
FIG. 2 illustrates a portion of the lower section of the transport assembly shown in FIG. 1.

FIG. 2 illustrates a portion of the lower section 106 of the transport assembly 100 shown in FIG. 1. More specifically, FIG. 2 illustrates a number of microelectromechanical devices 108 that consist of combinations of actuators 202, sensors 203, and controller(s) 230. In one embodiment, the actuators, sensors, and controller are fabricated together on a single silicon wafer. In another embodiment shown in FIG. 2, the sensors and actuators are fabricated in a housing separate from the controller 230. In the embodiment shown in FIG. 2, the actuators 202 are air jet actuators that include two or more channels 204. In another embodiment not shown the actuators 202 engage a mechanical drive coupled to rollers for transporting flexible objects such as paper.

More specifically in FIG. 2, the arrows indicated by reference number 206 illustrate the general movement of air exiting and entering the air jet channels 204. At least one of the channels of an air jet allows the exit of flowing air and the other of the channels the entrance of flowing air. It will be appreciated by those skilled in the art, however, that the air jet actuators may consist of a single channel which allows only the exit of air. A low-pressure plenum 214 is separated from high-pressure plenum 210 by a partition 216. The difference in pressure between low-pressure plenum 214 and high-pressure plenum 210 permits air to flow from one channel to another. For example, a valve 208 can be selectively operated to permit high-pressure air in plenum 210 to flow upward at an angle as indicated by arrows 220, to impart momentum to objects 102 on the transport assembly, and pass downward through valve 212 into plenum 214 as indicated by arrows 222.

Figure 3:
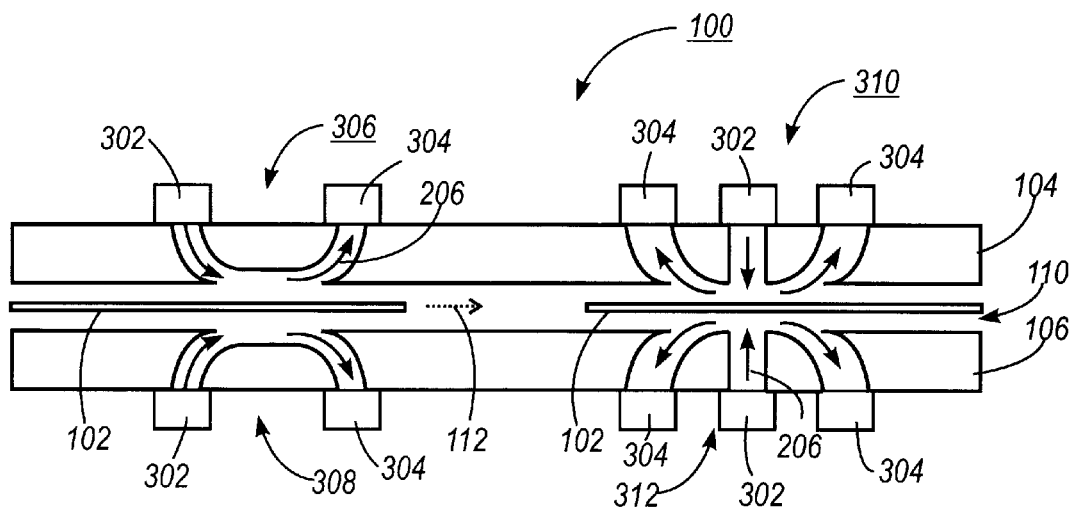
FIG. 3 illustrates two different types of air jets that are embedded in the transport assembly shown in FIG. 1.

FIG. 3 illustrates examples of two different types of air jet actuators 202 that are embedded in transport assembly shown in FIG. 1. As set forth above, the transport assembly 100 is divided into upper and lower sections 104 and 106 with the spacing or passageway 110 therebetween. A first type of air jet is indicated by reference numbers 306 and 308 and a second type of air jet by reference numbers 310 and 312. The two types of air jet actuators have valves 302 for releasing air from high-pressure plenum 212 and valves 304 receiving air into low-pressure plenum 214. The flow of air in FIG. 3 is indicated generally by arrows 206. Depending on the direction in which the air jet actuators 306 and 308 are positioned, air released therefrom will urge the object 102 in a selected process direction 112 and speed by adjusting the amount of air released onto either side of the object 102. In contrast, the air jet actuators 310 and 312 can be used to support the object 102 by applying an opposing vertically directed air flow as indicted by arrows from valves 302.

It will be appreciated by those skilled in the art that the first type of air jet actuators 306 and 308 may be positioned so that they exert a force opposite to that shown in the Figures in order to impart momentum to stop the object from moving in the process direction 112. In addition, it will be appreciated by those skilled in the art that two sets of the first type of air jet actuators 306 and 308 may be oriented to apply forces to rotate the object. For example, the object may be rotated by having a first set of air jet actuator, located on one side of the object, push in the process direction, while having a second set of air jet actuator, located on the other side of the object, push in a direction opposite to the process direction so that the combined effect of the two air jet actuators is to apply a torque to the object.

Figure 4:
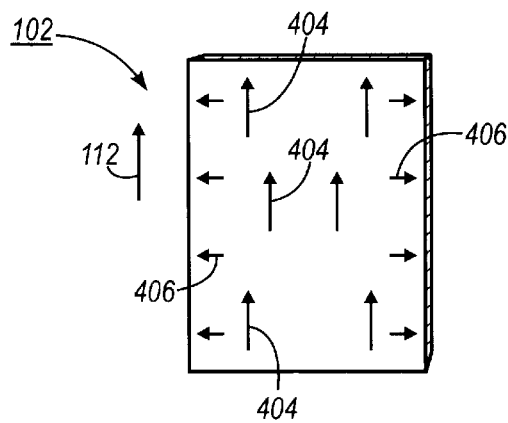
FIG. 4 illustrates one manner in which directional forces from air jets are applied to the object to control its movement along the transport assembly.

FIG. 4 illustrates one manner in which directional forces from air jet actuators 202 are applied to the object 102 to control its movement along transport assembly 100 in the process direction 112. Longitudinal forces, indicated by arrows 404, are applied to cause the object to move in the process direction 112. Lateral forces, indicated by arrows 406, are applied perpendicular to the direction of motion to stabilize the object 102. Vertical forces, not shown, help maintain the object 102 between the upper and lower sections 104 and 106 of the transport assembly 100. In FIG. 4, the relative strength of the forces 404 and 406 applied to the object 102 are illustrated by the length of the arrows 404 and 406. It will be appreciated by those skilled in the art that the accelerations resulting from these vertical, lateral, and longitudinal forces applied to an object will vary depending on the type of material and size of the object. Thus, for example, paper which is lighter and more flexible than glass may require smaller longitudinal forces but greater lateral forces to stabilize it on transport assembly 100 than a more rigid object such as glass.

Figure 5:
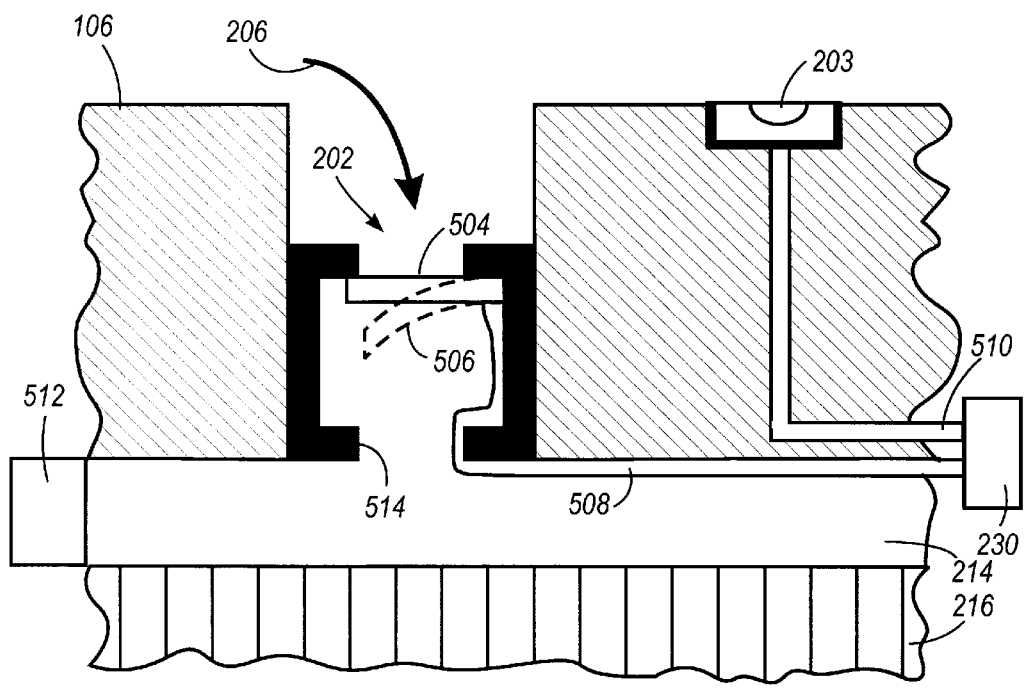
FIG. 5 illustrates a side view of an air jet, a sensor, and a controller as seen along view line 2—2 in FIG. 2.

FIG. 5 illustrates a side view of an air jet 202, sensor 203, and controller 230 as seen along view line 2—2 in FIG. 2. In the embodiment shown in FIG. 5, the air jet 202 is a piezoelectric flap valve. The flap valve is electrically controlled through lead 508 by controller 230 to be either in a closed position, indicated by reference number 504 (solid lines), or an open position, indicated by reference number 506 (dotted lines). The air jet 202 includes a housing 514 positioned in an aperture of the surface of lower section 106. In FIG. 5 the air moves inward because it is coupled to low-pressure plenum 214 as indicated by arrow 206. The pressure in the plenum is maintained by air pressure source 512. Sensor information from sensor 203 is received through lead 510 by controller 230. The sensor 203 in one embodiment is an optical sensor that is sufficiently accurate and quick to detect the object 102. In other embodiments, the sensor 203 is another type of contactless sensor such as a pressure sensor, acoustic sensor, or electrostatic sensor.

B. Distributed Control Organization

Figure 6:
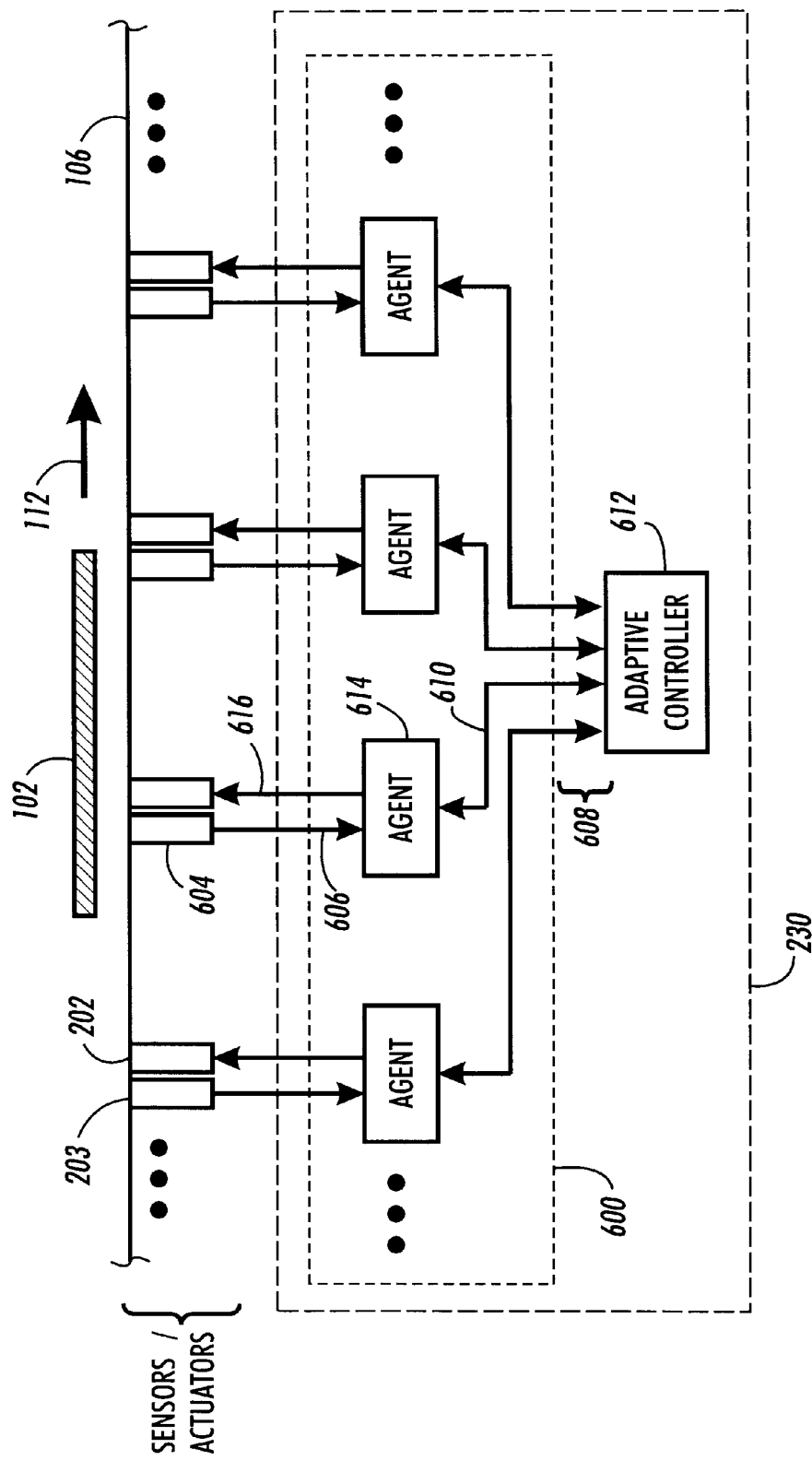
FIG. 6 illustrates a multi-agent distributed control system for controlling the movement of objects on the transport assembly.

FIG. 6 illustrates a multi-agent distributed control system for controlling the movement of objects on the transport assembly. Using the embedded microscopic sensors 203, actuators 202, and controller 230, the transport assembly 100 actively controls objects such as paper traveling between its upper and lower levels. In accordance with the invention, the control of sensor 203 and actuators 202 embedded in the transport assembly 102 is distributed among computational agents 600. Each of the computational agents 600 is responsible for a limited part of the entire control operation. Advantageously, distributing control among computational agents 600 permits each agent to independently compute the state of an object on the transport assembly that is within its domain of control. A further advantage is that the controller 230 does not require global analysis of the transport assembly to continually improve its performance when the system exhibits behavioral changes.

Each computational agent maps to a region of the transport assembly that includes one or more sensors and actuators. This mapping defines the system's local organizational structure (or interaction structure). Such a distributed organizational structure provides real time responses to local environmental changes detected along the transport assembly. It will be appreciated by those skilled in the art that the mapping between agents and sensors and actuators need not be homogeneous but instead can be inhomogeneous. In operation, each computational agent responds to environmental changes that sensors and actuators detect within a time interval on the order of 1–100 milliseconds. In the case of the transport assembly 100 shown in FIG. 1, sensors 203 and air jets 202 quickly ascertain the amount of force to apply to each object or paper 102 on the transport assembly within a time interval to precisely move the object along the transport assembly. During each time interval, multiple sets of computational agents operate to stabilize and propel one or more objects along the transport assembly.

Unlike other distributed control organizations, the sensors and actuators embedded in the transport assembly are arranged in dense formations. In one embodiment, the lower section of transport assembly 106 has on the order of 0.1–4 sensors and/or actuators per square centimeter. In addition, unlike other distributed control systems, the actuators are positioned sufficiently proximate to each other that their output may be cross-coupled. For example, output from two neighboring air jets may cumulatively apply a force that is different than the sum of the forces applied independently. In such a case, each low-level control agent requires some knowledge about its neighbors. To account for these interaction effects, the controller 230 may be organized into sets of hierarchically organized computational agents or processes to minimize actuation effort required by each individual actuator and the error in following a desired trajectory of the object (i.e., system goal). In one instance, the desired trajectory defines how the object moves on the transport assembly as a function of time. In such hierarchical organizations, the control domain of each set of computational agents does not extend beyond some localized region of control. By distributing control among local groupings of sensors and actuators, response to local changes can be made even in the presence of delays and corrupted information. Furthermore, the distributed control organization can scale without a significant decrease in the response time of other sets of computational agents.

More specifically, FIG. 6 illustrates a block diagram of a cross section of the lower section 106 of the transport assembly 100. Embedded at the surface of the lower section 106 are multiple sensors 202 and actuators 203. The sensors 203 transmit positional information of the object 102 to the controller 230, while the actuators or air jets 202 receive commands from the controller 230 to apply directional forces in the form of air to the object 102. Although FIG. 6 shows each computational agent 600 coupled one sensors 203 and actuators 202, it will be understood by those skilled in the art that an actuator such as an air jet may include one or more channels of exiting or entering air and that a sensor may have one or more sensor elements. In addition, it will be appreciated by those skilled in the art that the computational agents 600 may be coupled to sets of sensors and actuators, and that the number of sensors and actuators in each set may vary in number from agent to agent.

While moving objects along the transport assembly, each sensor 203 embedded in lower level 106 records sensor data of the objects approximately every 100 milliseconds. The recorded sensor data corresponds to the instantaneous position and/or velocity of an object on the transport assembly. The sensor data transmitted from the sensors 203 is received by computational agents 600 to which they are directly coupled. For example in FIG. 6, agent 614 receives sensor data from sensor 604 to which it is directly coupled, as indicated by arrow 606. After receiving sensor data, each computational agent "j" computes a local performance error $x_j$. Each local performance error $x_j$ computed by each agent represents the deviation of an object's actual trajectory from its desired trajectory (i.e., system goal). Each object's desired trajectory is specified as a function of the object's position and/or velocity on the transport assembly.

C. Dynamically Adjusting the Distributed Control Organization

In order to improve the performance of the transport assembly (e.g., the system's ability to control movement of an object), the organizational structure of the computational agents is modified by adaptive controller 612. In modifying the organizational structure of the computational agents, the adaptive controller 612 receives the local performance error $x_j$ from each agent "j", as indicated by reference number 608. The adaptive controller 612 modifies the local performance errors by changing an interaction matrix "a" which defines the organizational structure of the agents. More specifically, the interaction matrix "a" defines how the sensor information received by each agent is shared. In one embodiment, changes to the elements $a_{ij}$ of the interaction matrix "a" are computed by adaptive controller 612. In another embodiment, each of the computational agents 600 computes changes to the elements $a_{ij}$ of the interaction matrix "a". The manner in which the elements $a_{ij}$ of the interaction matrix "a" are changes, is described in detail below.

Using the elements $a_{ij}$ of the interaction matrix "a" and the local performance error $x_j$ of each agent, the adaptive controller 612 modifies the organizational structure of the transport assembly by computing an adjusted performance error $X_i$ for each agent "i". The adjusted performance error $X_i$ for an agent i is defined by the following equation:

$$X_i = \sum_{j=1}^{n} a_{ij} x_j, \text{ where}$$

$a_{ij}$ are elements of the interaction matrix "a"; and $x_j$ is the local performance error for agent j.

How the local performance error $x_j$ of each agent is adjusted depends on the values of the elements $a_{ij}$ of the interaction matrix "a". The elements $a_{ij}$ define the organization of the multiple agent system by defining the influence of sensor information at location "j" on the agent at location "i". Once computed, the adaptive controller 612 transmits the adjusted performance error $X_i$ to each agent "i" as indicated by arrow 610. In an alternate embodiment, each computational agents 600 performs the computational operations of the adaptive controller 612. In this alternate embodiment, the agents 600 are coupled together by communication networks for either directly transmitting or broadcasting their local sensor data to each other. Examples of communication networks include token ring and token bus networks. In general, these and other communication networks allow any agent "i" to access sensor information at any location "j" on the transport assembly.

Using the adjusted performance error $X_i$, each agent "i" computes a desired actuator response $H_i$. As set forth in the equation above, the values of each element $a_{ij}$ determines which local performance errors $x_j$ the individual agents pay attention when determining their desired actuator response $H_i$. This desired actuator response specifies a desired state for the actuators directly coupled to the agent "i" that would best achieve the object's desired trajectory (or system goal). In one embodiment, the actuator response $H_i$ is given by the inverse of the performance error $X_i$, (i.e., $H_i = -X_i$). Using the actuator response $H_i$, the adjustment to the actuators is quantified (e.g., a valve setting) to control the motion of the object on the transport assembly. If sufficient system resources exist, the desired actuator adjustments computed by each of the computational agents 600 are transmitted to the actuators 202, as indicated by arrows 616. If insufficient resources exist to perform all of the actuator adjustments, then only some of the adjustments may be processed. This process of adjusting actuators repeats each time sensor information is received by an agent, thereby creating a feedback loop in which sensor information is received and actuator adjustments are issued approximately every 100 milliseconds.

D. Incremental Modification of the Interaction Structure

In general, the value of the elements $a_{ij}$ of the interaction matrix "a" represent the organizational structure of the multi-agent control system 230. When the organizational structure of the system accurately models the behavior of the transport assembly, system performance is maximized. However, because the organizational structure which maximizes system performance is typically unknown, improved performance is learned through a series of iterative adjustments to the interaction structure (i.e., interaction matrix "a") of the system. By making these adjustments, the adaptive controller 612 maximizes the performance of the multi-agent control system 230 by finding the interaction structure that best defines its operational characteristics of the transport assembly.

More specifically, incremental adjustments to the multi-agent control system 230 are made by adding an incremental change $f_{kl}$ the elements $a_{kl}$ of the interaction matrix "a". The adjustments to each element $a_{kl}$ in the interaction matrix "a" can be defined generally as follows:

$$a_{kl} \leftarrow \max\{0, N(a_{kl} + f_{kl})\},$$

where

N is a normalization factor.

In one embodiment, the incremental change $f_{kl}$ to the element $a_{kl}$ in the interaction matrix "a" is given by:

$$f_{kl} = \delta(\max\{0, 1 - \in(|k-i| + |l-j|)\}),$$

where δ is a measure of the strength of the incremental change (the sign of δ, which can be positive or negative, is chosen randomly);

(i,j) is a randomly chosen location in the interaction matrix at which the incremental change is centered;

($|k-i| + |l-j|$) is a distance measure from the location (i,j); and $\in$ is a measure of the size of a neighborhood of elements $a_{ij}$ centered at location i,j in the interaction matrix.

Since the sign of the strength of the change δ can be either positive or negative, the incremental change $f_{kl}$ can be either positive or negative. However, the incremental change $f_{kl}$ is applied at location (k,l) of the interaction matrix "a" if the resulting value of N $(a_{kl} + f_{kl})$ is positive; otherwise, if the resulting value of N $(a_{kl} + f_{kl})$ is negative then zero is applied at location (k,l) of the interaction matrix "a". This insures the neighborhood of elements $a_{ij}$, which is centered at location (i,j) in the interaction matrix "a" is non-negative. Non-negative values of elements $a_{ij}$ depict the significance of information from other agents. In an alternate embodiment, negative values are permitted. In this alternate embodiment the interaction matrix "a" would therefore define not only the significance (magnitude of elements $a_{ij}$) of information from agents but also whether agents should reverse the significance of information from other agents (sign of element $a_{ij}$).

After performing an incremental change, the interaction matrix "a" is normalized to insure that the sum of its elements $a_{ij}$ remains constant during the iterative learning process. In another embodiment, the elements $a_{kl}$ of the interaction matrix "a" are not normalized as set forth in the equation above. The effect of an incremental change is tested to determine whether system performance improved. In one embodiment, performance is determined simply as a measure of the amount of actuation effort required to achieve the system goal of moving an object from one location to another on the transport assembly. It will be appreciated by those skilled in the art that many alternate measures of system performance exist, such as the accuracy with which the object is moved along the transport assembly, the speed at which the transport assembly recovers from sudden changes, and the quantity of actuators used to operate the transport assembly. Upon finding an interaction matrix that maximizes system performance, that interaction matrix is used for some fixed period of time or until system performance falls below an unacceptable level; at which time, the system resumes making incremental adjustments to its interaction matrix "a", thereby continuously improving system performance.

Figure 7:
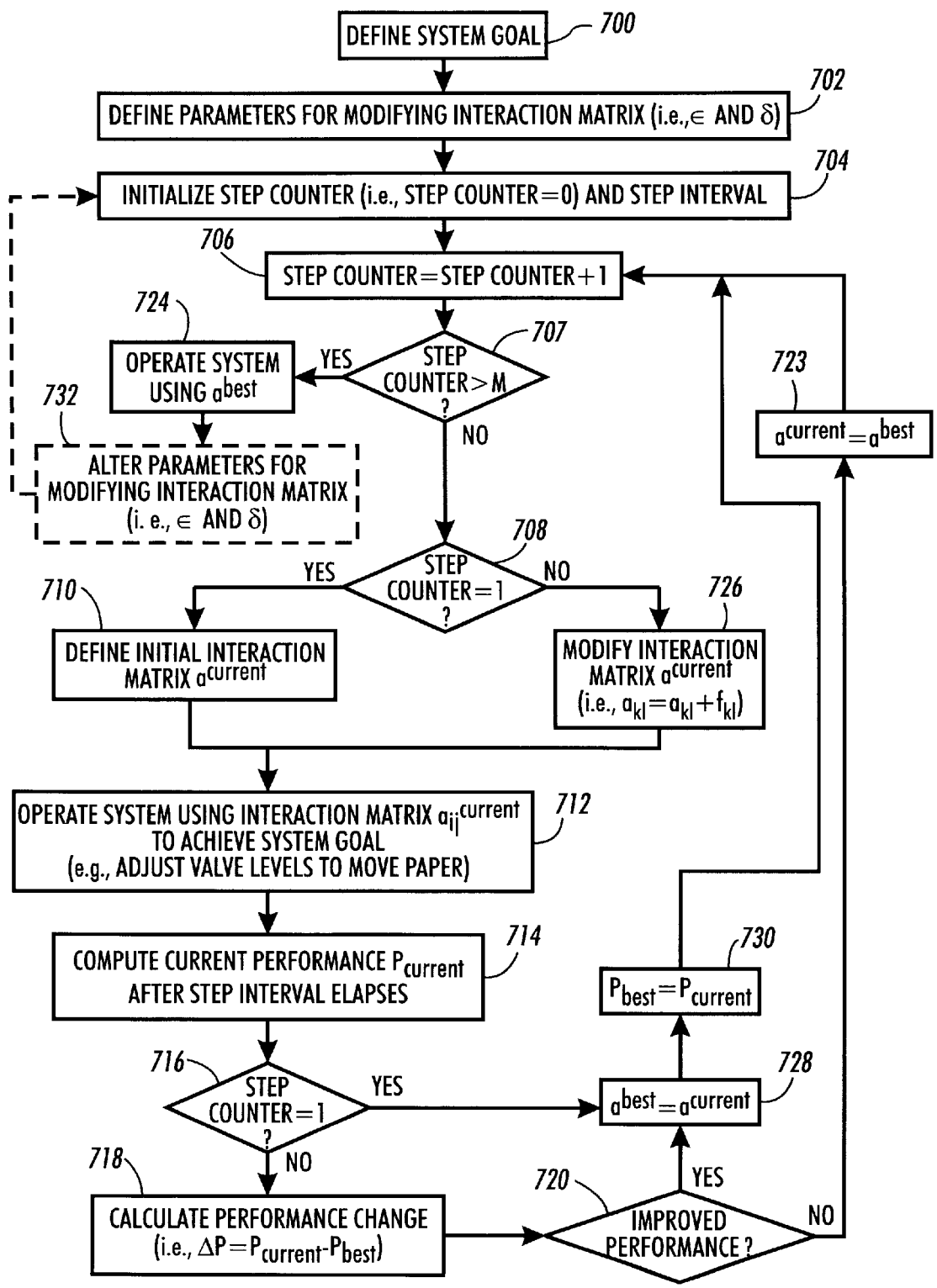
FIG. 7 is a flow diagram which sets forth the steps performed for identifying a distributed organizational structure that maximizes system performance.

FIG. 7 is a flow diagram which sets forth the steps performed by the adaptive controller 612 for identifying a distributed organizational structure that maximizes system performance. More specifically, the flow diagram illustrates a specific learning mechanism used to adjust the organizational structure of the computational agents 600. The system goal, which is defined at step 700, may for example be to move an object on the transport assembly from a first position $x_1$ to a second position $x_2$ at a velocity v. At step 702, the parameters $\delta$ and $\in$ for modifying the interaction matrix "a" are defined. The parameters $\delta$ and $\in$, which are defined in more detail above, specify the rate at which regions of agent interaction change. At step 704, a step counter and a step interval are initialized. The step counter, which is initialized to zero, is a variable which tracks the number of incremental changes performed. The step interval is initialized to some period of time over which performance of the system goal can be measured. In one embodiment, the step interval is initialized to be the period of time required to move an object from a first location to a second location on the transport assembly. However, it will be appreciated by those skilled in the art that the interval of time over which performance of the system is measured need not be fixed. Instead, the performance criteria used to measure whether the system has experienced improved performance need not relate to time but instead can relate to the occurrence of an event (e.g., paper on transport arriving at a location at a particular speed). At step 706, the step counter is incremented. If at step 707 the step counter is greater than some predefined maximum M, then step 724 is performed; otherwise, step 708 is performed. At step 708, if the step counter is equal to one then step 710 is performed; otherwise, step 726 is performed.

At step 710, initial values are assigned to the elements $a_{ij}$ of an interaction matrix $a^{current}$ that is used to operate the transport assembly. The initial values of the elements $a_{ij}$ of the interaction matrix $a^{current}$ are defined using a simple organizational structure having elements $a_{ij}$ that reflect estimated or nominal system parameters. In one embodiment, the initial values of the interaction matrix $a^{current}$ are defined with a local interaction structure. In a local interaction structure, each computational agent only considers its local performance error $x_j$ (i.e., the elements $a_{ij}$ equal one where i=j and zero elsewhere). In alternate embodiments, the initial values of the interaction matrix $a^{current}$ are defined using either a global, a hierarchical, or a multihierarchical organizational structure. Examples of these structures are disclosed by Guenther et al. in "Controls for Unstable Structures", Proc. of SPIE Conference on Mathematics and Controls in Smart Structures, March 1997, pp. 754–763.

At step 712, the transport assembly operates using the current interaction matrix $a^{current}$ to achieve the desired trajectory of the object (i.e., system goal) defined at step 700. In one embodiment, the system operates to achieve its desired trajectory using a market based controller. An example of a market based controller is disclosed in U.S. patent application Ser. No. 09/033,221. After the step interval elapses, the current performance $P_{current}$ is computed at step 714. The measure of the current performance $P_{current}$ is defined using, for example, the amount of system resources consumed during the step interval. At step 716, if the step counter is equal to one then the step 728 is performed; otherwise, step 718 is performed. At step 728, the current interaction matrix $a^{current}$ is assumed to be the best performing interaction matrix $a^{best}$. In addition at step 730, the best performance $P_{best}$ of the system over the step interval is assigned to equal the current performance $P_{current}$, at step 714. After performing steps 728 and 730, step 706 is repeated.

After the step counter increments passed one at step 706, step 726 is performed. At step 726, the current interaction matrix $a^{current}$ is modified. The modification to the current interaction matrix $a^{current}$ is in the form of the incremental change $f_{kl}$, defined above, to certain elements $a_{ij}$. During each iterative change at step 726, the center of the change (i,j) in the interaction matrix is chosen randomly. Which elements $a_{ij}$ are changed and how strongly they are changed depends on the values of the parameters defined at step 702. The strength of the change at each iteration is defined by the strength measure $\delta$. As defined above, the neighborhood of the incremental change $f_{kl}$ is defined in one embodiment using the 1-norm, or "taxicab" metric (i.e., $|k-i|+|l-j|$). Alternatively, the neighborhood of incremental change can be defined using other metrics such as an ultra-metric (e.g., the distance to a nearest ancestor in a hierarchy) or an Euclidean metric (e.g., $((k-i)^2+(I-j)^2)^{1/2}$).

FIGS. 8 and 9 illustrate an example an interaction matrix that is modified by an incremental change $f_{kl}$ after one step interval. In each Figure, the columns represent agent i, and rows represent agent j starting in the lower left corner with agent one and continuing to agent ten. The value in each square represent the amount of interaction between agent i and agent j at that position. More specifically, FIG. 8 illustrates an initial interaction matrix $a^{current}$ having a local organization. Using the interaction matrix $a^{current}$ shown in FIG. 8 results in a performance error for the agent "i=4" that is given by:

$$X_{i=4}=a_{4,4}x_4=(1)x_4.$$

After a first iteration, the local interaction structure is modified as shown in FIG. 9. In this example, $\delta$ is assumed to be equal to 1 and $\in$ is assumed to be equal to ⅓. Also, the randomly chosen center location is selected to be i=4 and j=6. Note that the adjusted interaction values set forth in each square of the matrix shown in FIG. 8 have not been normalized. The resulting performance error for agent "i=4" is then given by:

$$X_{i=4} = a_{4,4}x_4 + a_{4,5}x_5 + a_{4,6}x_6 + a_{4,7}x_7 + a_{4,8}x_8$$
$$= N[(4/3)x_4 + (2/3)x_5 + (1)x_6 + (2/3)x_7 + (1/3)x_8].$$

To recapitulate, at step 726 shown in FIG. 7, a plurality of elements $a_{ij}$ of the interaction matrix are changed at one time around a randomly selected center location (i,j). In a system having a tight physical coupling between the actuators and sensors, this method for changing the interaction matrix provides a reasonable compromise between having a change that is large enough to provide fast convergence in performance and having a change with a small enough scale to prevent compensating effects. Generally, the neighboring elements $a_{ij}$ of the interaction matrix "a" corresponds to neighboring sensors and actuators in physical space. Since physical interactions of the tightly coupled sensors and actuators generally decrease with distance, this method for making iterative changes to the interaction structure exploits the locality of interactions in physical space.

After changing some of the elements $a_{ij}$ in the current interaction matrix $a^{current}$, the transport assembly may result in a different controlling performance after operating at step 712. Subsequently, an operating performance is computed at step 714 after the step interval elapses. When the step counter is greater than one, step 718 is performed. At step 718, the performance change value ΔP is calculated. The performance change value ΔP is the difference between the current performance $P_{current}$ of the current interaction matrix $a^{current}$ and the best performance (so far) $P_{best}$ of the best interaction matrix $a_{best}$ (i.e., $\Delta P = P_{current} - P_{best}$). The amount of performance change between step intervals depends on the parameters δ and ∈ of the incremental change $f_{kl}$. Too few changes to the interaction matrix $a^{current}$ requires too many iterative steps; whereas, too many changes defines an interaction matrix $a^{current}$ in which learning is inefficient because of compensating effects.

If at step 720 the performance of the system improves, then step 728 is repeated; otherwise, step 723 is performed. System performance is determined to have improved when the change in performance ΔP calculated at step 718 is greater than some threshold value T. At step 723, the current interaction matrix $a^{current}$ is reset to equal the currently best performing interaction matrix $a^{best}$ in accordance with a hill climbing learning strategy. In an alternate embodiment, the hill climbing strategy set forth in FIG. 7 is modified to follows a simulated annealing learning strategy. Subsequent to performing step 723, step 706 is repeated.

At step 724, the system operates using the interaction matrix $a^{best}$ identified after performing M steps of the iterative learning process. After some fixed period of time or when the system performance falls below an unacceptable level, step 732 is performed. At step 732, the parameters δ and ∈ that define how the interaction matrix "a" is modified are altered. Subsequently, the system resumes making incremental adjustments to its interaction matrix "a" at step 704 to identify a better performing interaction matrix $a^{best}$ that maximizes system performance.

E. Active Stabilization of Structures

Figure 10:
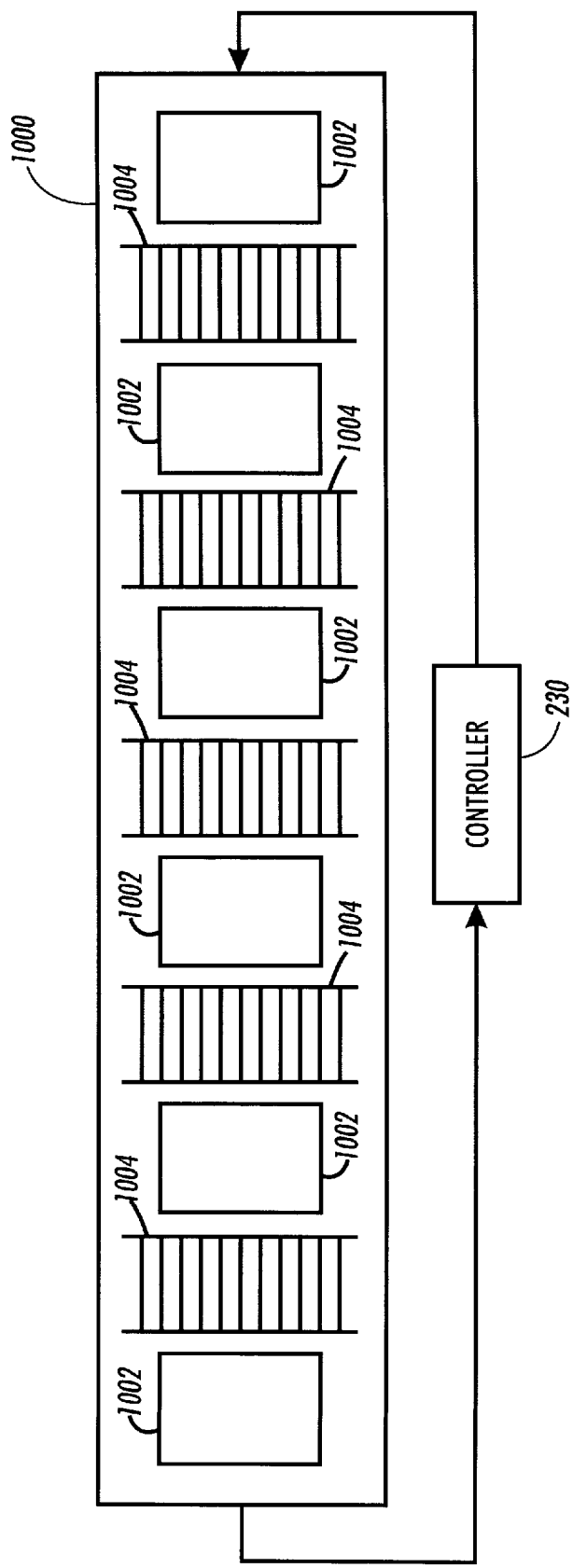
FIG. 10 illustrates an alternate embodiment in which the controller shown in the Figures controls the stability of a beam, as seen from a top-down view.
Figure 11:
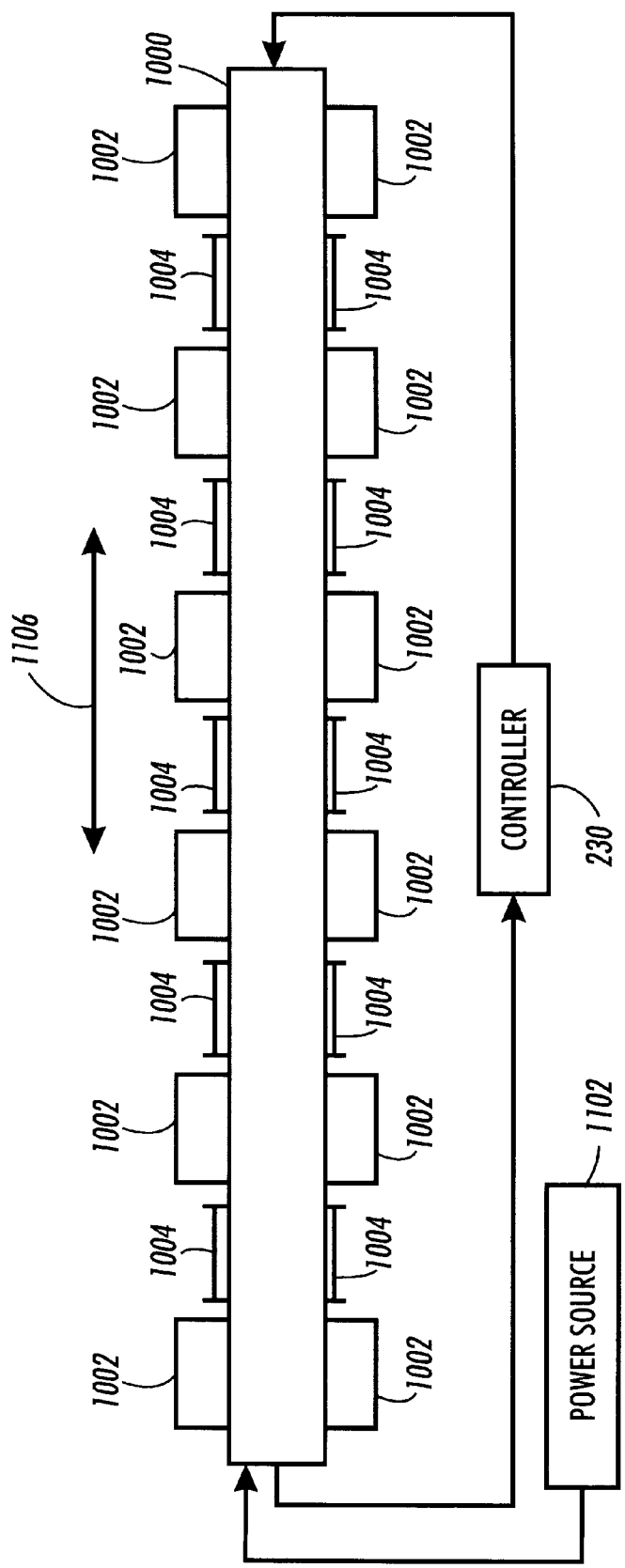
FIG. 11 illustrates a side view of the beam shown in FIG. 10.

FIGS. 10–11 illustrate an alternate embodiment in which the based control system illustrated in FIG. 6 is used to control a beam 1000 which may buckle or become unstable under a load. More specifically, FIG. 10 illustrates a top-down view while FIG. 11 illustrates a side view of the beam 1000. Actuators 1004, which are interlaced longitudinally between sensors 1002 on both sides of the beam 1000, exert forces specified by controller 230 to modify the structural behavior of the beam. The controller 230, which is coupled to actuators 1004 and sensors 1002, consists of agents that control actuators 1004 to stabilize and strengthen the beam 1000. The beam is stabilized when linear buckling of the beam is minimized, and strengthened when the buckling load of the beam is increased.

In operation, agents in the controller 230 determine appropriate forces at which to set patches of piezo-ceramic actuators 1004 from measurements received from strain sensors 1002. These agents use the measurements from the strain sensors 1002 to detect structural deformation of the beam. The agents in controller 230 are mapped to mapped to sensors and actuators positioned along the beam. To counterbalance structural deformations, the agents use power delivered from power source 1102 to drive the actuator patches 1004 to either expand or contract longitudinally as indicated by arrow 1106, thereby creating surface strains on the beam 1000.

Figure 12:
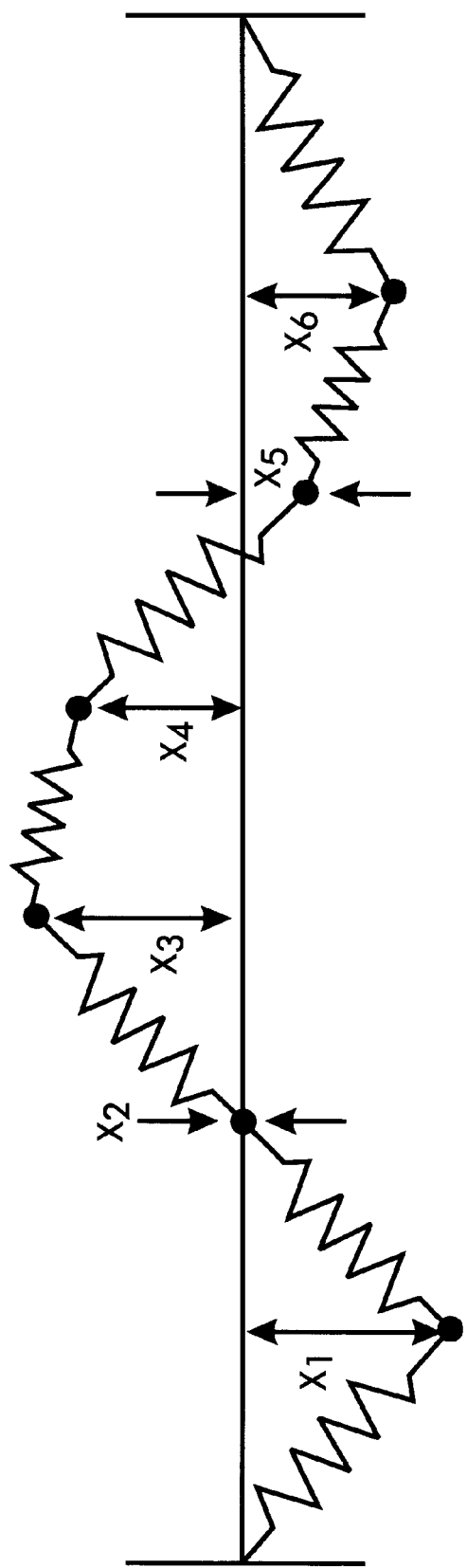
FIG. 12 illustrates the beam shown in FIGS. 10 and 11 modeled using an unstable chain of mass points connected to their neighbors by springs.

In one embodiment, the beam illustrated in FIGS. 10–11 is modeled using an unstable chain of mass points connected to their neighbors by springs, as illustrated in FIG. 12. The chain is inherently unstable because it tends to drive away from its desired configuration. The dynamical behavior of the chain is described using a number of mass points n, a spring constant k, a destabilizing force f, and a damping coefficient g. In this embodiment, an adaptive controller in the controller 230 adjust their organizational structure to improve system performance. When computing the adjusted performance error $X_i$ for an agent i defined above, the adaptive controller defines the local performance error $x_j$ using the displacement of the mass points. The elements $a_{ij}$ of the interaction matrix "a" define which and how much of the displacements $x_j$ each agent pays attention to when determining how much force to exert on a mass point to maintain it in a fixed position.

More details of the based controller 230 for controlling an inherently unstable chain is disclosed by Guenther et al., "Multiagent Learning for Controlling Smart Matter," in Proc. of the AAAI97 Workshop on Multiagent Learning, pp. 36–40, July, 1997 (also available on the Internet at http://www.parc.xerox.com/spl/groups/dynamics/www/beam-learning.html), which is incorporated herein by reference.

F. Summary

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

It will be appreciated that the controller 230 may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

In addition, the controller 230 may either be a physically distributed system in which each agent is operating on a separate processing unit. Alternatively, the controller may be implemented in a memory of a centralized processing unit having one or more processors. Because each agent does not have to be cognizant of whether it is operating on a physically distributed or centralized system, the software for implementing the controller can be implemented to run in either environment. In either embodiment, the system can be readily developed by those skilled in the applicable arts without undue experimentation from the functional description provided herein together with a general knowledge of the computer arts.

It will be further appreciated by those skilled in the art that actuators 202 can be used to move an object along the transport assembly with fluids other than air. It will also be appreciated by those skilled in the art that the controller 230 can be used to control other types of pneumatic actuators such as vacuum actuators. In addition, it will be appreciated that the controller can be used to control mechanical actuators. For example, controller 230 can be used to control mechanical rollers or a vacuum belt to move sheets of paper in an electronic printing machine. In another embodiment, not shown, the agents are coupled to sensor units that are physically offset from actuator units on the transport assembly. In this alternate embodiment, the agents are coupled to sensor units and actuator units which are not co-located immediately adjacent to each other.

A more detailed description of the sensors and actuators forming a transport assembly is disclosed in U.S. Pat. No. 5,634,636, which is incorporated herein by reference.

We claim:

1. A transport assembly for moving an object, comprising:

sensor units and actuator units arranged on the transport assembly; said sensor units for providing positional information of the object; said actuator units for controlling a resource for moving the object relative to the transport assembly;

computational agents coupled said sensor units and said actuator units; each of said computational agents accumulating sensor information from a spatially localized grouping of sensor units; and an adaptive controller coupled to said computational agents for specifying an interaction structure that defines which of said computational agents share their accumulated sensor information with other of said computational agents when determining adjustments to said actuator units; said adaptive controller adjusting the interaction structure of said computational agents to improve performance of the transport assembly.

2. The transport assembly according to claim 1, wherein said adaptive controller performs iterative adjustments.

3. The transport assembly according to claim 1, wherein each of said computational agents located proximate to one of said sensor units and one of said actuator units.

4. The transport assembly according to claim 1, wherein said computational agents further comprises:

a memory for storing computational instructions; and a processor coupled to memory for executing the computational instructions.

5. The transport assembly according to claim 1, wherein the resource is an air flow.

6. The transport assembly according to claim 1, wherein the object is paper.

7. The transport assembly according to claim 1, wherein each of said computational agents accumulate sensor information from a spatially localized grouping of neighboring sensor units.

8. The transport assembly according to claim 1, wherein said adaptive controller specifies the interaction structure with a matrix "a" having elements $a_{ij}$.

9. The transport assembly according to claim 8, wherein said adaptive controller modifies a plurality of the elements $a_{ij}$.

10. The transport assembly according to claim 8, wherein each of said computational agents computes a performance error $X_i$ for computational agent i given by the following equation:

$$X_i = \sum_{j=1}^{n} a_{i,j} x_j, \text{ where}$$

$a_{ij}$ are elements of the matrix "a"; and $x_j$ is local performance error for computational agent j.

11. The transport assembly according to claim 8, wherein said adaptive controller performs incremental changes to the elements $a_{ij}$ of the matrix "a".

12. The transport assembly according to claim 11, wherein said adaptive controller adds an incremental change $f_{kl}$ to the element $a_{kl}$ in the interaction matrix "a" according to the following equation:

$$f_{kl} = \delta(\max\{0, 1 - \in(|k-i|+|l-j|)\}),$$

where $\delta$ is a measure of strength of the incremental change;

(i,j) is a randomly chosen location in the interaction matrix at which the incremental change is centered;

(|k−i|+|l−j|) is a distance measure from the location (i,j); and $\in$ is a measure of size of a neighborhood of elements centered at location i,j in the interaction matrix.

13. The transport assembly according to claim 12, wherein adjustments to each element $a_{kl}$ is given by the following equation:

$$\max\{0, (a_{kl}+f_{kl})\}.$$

14. A method for operating a multi-agent control system for controlling a transport assembly, each agent in the control system being coupled to selected sensors and actuators forming the smart matter, comprising the steps of:

(a) defining an interaction matrix with elements $a_{ij}$; each element $a_{ij}$ having an initial value that defines how information is shared between agent "j" and agent "i";

(b) operating the multi-agent control system over a predefined interval;

(c) modifying selected elements $a_{ij}$ of the interaction matrix;

(d) evaluating performance of the multi-agent control system after repeating step (b); and (e) retaining the modifications to the selected elements $a_{ij}$ if the performance of the multi-agent control system improves at step (d).

15. The method according to claim 14, further comprising the step of defining a performance criteria before performing said step (b).

16. The method according to claim 14, further comprising the step of defining parameters for modifying the selected elements $a_{ij}$ of the interaction matrix.

17. The method according to claim 14, further comprising the step of computing a performance error $X_i$ for agent i given by the following equation:

$$X_i = \sum_{j=1}^{n} a_{i,j} x_j, \text{ where}$$

$a_{ij}$ are elements of the interaction matrix; and $x_j$ is local performance error for agent j.

18. A method for operating a multi-agent control system for controlling a paper transport assembly, each agent in the control system being coupled to selected sensors and actuators forming the paper transport assembly, comprising the steps of:

(a) defining an interaction matrix with elements $a_{ij}$; each element $a_{ij}$ having an initial value that defines how information is shared between agent "j" and agent "i";

(b) operating the multi-agent control system over a predefined interval;

(c) modifying selected elements $a_{ij}$ of the interaction matrix;

(d) evaluating performance of the multi-agent control system after repeating step (b); and (e) retaining the modifications to the selected elements $a_{ij}$ if the performance of the multi-agent control system improves at step (d).

19. The method according to claim 14, wherein said modifying step modifies the selected elements $a_{ij}$ with an incremental change $f_{kl}$ given by:

$$f_{kl} = \delta(\max\{0, 1-\in(|k-i|+|l-j|)\}),$$

where $\delta$ is a measure of strength of the incremental change;

(i,j) is a randomly chosen location in the interaction matrix at which the incremental change is centered;

$(|k-i|+|l-j|)$ is a distance measure from the location (i,j); and $\in$ is a measure of size of a neighborhood of elements centered at location i,j in the interaction matrix.

20. The method according to claim 19, wherein said modifying step applies only positive incremental changes at location (k,l).

* * * * *